United States Patent
Hamann

(10) Patent No.: US 6,603,095 B2
(45) Date of Patent: Aug. 5, 2003

(54) APPARATUS AND METHOD OF OVERLAPPING FORMATION OF CHAMFERS AND ORIFICES BY LASER LIGHT

(75) Inventor: Christoph Hamann, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/909,974

(22) Filed: Jul. 23, 2001

(65) Prior Publication Data

US 2003/0015504 A1 Jan. 23, 2003

(51) Int. Cl.⁷ ............................................. B23K 26/38
(52) U.S. Cl. ................................................. 219/121.7
(58) Field of Search ........................ 219/121.7, 121.71, 219/121.67, 121.72, 121.77

(56) References Cited

U.S. PATENT DOCUMENTS

| | | | |
|---|---|---|---|
| 3,953,706 A | 4/1976 | Harris et al. ............. 219/121 L |
| 4,059,876 A | 11/1977 | Ditto ..................... 29/156.7 A |
| 4,160,894 A | 7/1979 | Stemmler et al. ........ 219/121 L |
| 4,370,540 A | 1/1983 | Davis et al. .......... 219/121 LM |
| 4,694,139 A | * 9/1987 | Roder | |
| 4,818,834 A | * 4/1989 | Rupert | |
| 4,911,711 A | 3/1990 | Telfair et al. .................. 606/5 |
| 5,043,553 A | 8/1991 | Corfe et al. ............. 219/121.7 |
| 5,093,548 A | 3/1992 | Schmidt-Hebbel ..... 219/121.71 |
| 5,163,934 A | 11/1992 | Munnerlyn ..................... 606/5 |
| 5,237,148 A | 8/1993 | Aoki et al. .............. 219/121.7 |
| 5,523,544 A | 6/1996 | Hertzel et al. ........... 219/121.7 |
| 5,607,606 A | 3/1997 | Mori et al. ............ 219/121.67 |
| 5,632,083 A | 5/1997 | Tada et al. ..................... 29/827 |
| 5,885,199 A | * 3/1999 | Shao | |
| 6,172,331 B1 | 1/2001 | Chen ...................... 219/212.71 |
| 6,229,113 B1 | 5/2001 | Brown .................... 219/121.7 |
| 6,264,486 B1 | * 7/2001 | Jiang et al. | |

FOREIGN PATENT DOCUMENTS

| GB | 2 328 894 | 3/1999 |
| JP | 40923066 A | * 9/1997 |

OTHER PUBLICATIONS

U.S. patent application No. 09/917,918, J. Horsting, et al., Jul. 31, 2001, allowed.
U.S. patent application No. 09/917,917, J. Horsting, filed Jul. 31, 2001, allowed.

* cited by examiner

*Primary Examiner*—Samuel M. Heinrich

(57) ABSTRACT

The present invention provides an apparatus that can form a plurality of orifices where the orifices are consistent dimensionally, such as, for example, the diameter, the surface roughness or the entry and exit configurations. Preferably, the invention provides a laser machining apparatus. The apparatus includes a laser light source that provides a generally coherent light beam along the beam's axis. The apparatus also includes a light directing device to direct a first portion of light from the light beam to a work piece at a first angle of incidence relative to the axis of the light beam during a first time interval to form at least one of an orifice and a chamfer. The apparatus further includes an adjustable beam splitter assembly to direct another portion of the light beam to form the other of the at least one of an orifice and a chamfer in the work piece during a second time interval that overlaps a portion of the first time interval. The method includes providing at least a first beam and a second beam that are emitted from the laser light source towards the workpiece; and rotating at least a first beam and a second beam with respect to the longitudinal axis. The method further includes forming at least one orifice in the workpiece with at least one of the first and second beams during a first time interval; and forming the at least one chamfer in the workpiece with the other of the first and second beams during a second time interval that overlaps a portion of the first time interval.

25 Claims, 2 Drawing Sheets

APPARATUS AND METHOD OF OVERLAPPING FORMATION OF CHAMFERS AND ORIFICES BY LASER LIGHT

BACKGROUND OF THE INVENTION

A fuel injector is believed to deliver fuel at specific time intervals and in precise amounts to intake valves and/or the combustion chamber of an internal combustion engine. It is further believed that fuel flowing through a fuel injector typically exits at a nozzle end of the fuel injector, and that the nozzle end typically has a disk with one or more orifices disposed thereon. It is believed that the resulting spray direction, spray particle size, spray mass flow, and spray pattern from the nozzle are a function of, among other variables, the geometry of the orifices.

An orifice is believed to be formed by drilling through a work piece that can be of any shape, including a flat piece (or disk). There are many known methods of drilling orifices for a fuel injector, including trepanning, mechanical punching and electric discharge machining (EDM). It is believed that these methods are only capable of forming orifices of 150 to 200 microns in diameter or larger. Moreover, it is also believed that these methods are incapable of forming orifices with large targeting angles. It is further believed that future low emission standards will require smaller orifices configured at significantly larger targeting angles for smaller fuel spray droplets and shorter fuel spray duration. It is therefore believed that it will be technically infeasible and/or cost prohibitive to manufacture orifices using known methods once more restrictive emission standards are adopted.

SUMMARY OF THE INVENTION

The present invention provides an apparatus that can form a plurality of orifices that are dimensionally consistent, such as, for example, the diameter, the surface roughness or the entry and exit configurations. In a preferred embodiment, the invention provides a laser machining apparatus. The apparatus includes a laser light source that provides a generally coherent light beam along the beam's axis. The apparatus also includes a light directing device to direct a first portion of light from the light beam to a work piece at a first angle of incidence relative to the beam's axis during a first time interval to form at least one of an orifice and a chamfer. The apparatus further includes an adjustable beam splitter assembly to direct another portion of the light beam to form the other of the at least one of an orifice and a chamfer in the work piece during a second time interval that overlaps a portion of the first time interval.

The present invention additionally provides a method of forming at least one orifice in a workpiece and also machining the entry or exit surfaces (e.g., a chamfer) of the orifice at or about the same time as the orifice is formed. The at least one orifice is disposed along a longitudinal axis extending between a first surface and a second surface of a workpiece. The chamfer is disposed proximate at least one of the first surface and the second surface. In another preferred embodiment, the method can be achieved by providing at least a first beam and a second beam that are emitted from the laser light source towards the workpiece; rotating at least a first beam and a second beam with respect to the longitudinal axis; forming at least one orifice in the workpiece with at least one of the first and second beams during a first time interval; and forming the at least one chamfer in the workpiece with the other of the first and second beams during a second time interval that overlaps a portion of the first time interval.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention

DETAILED DESCRIPTION OF THE PREFERRED EMBODIMENTS

Figure 1:
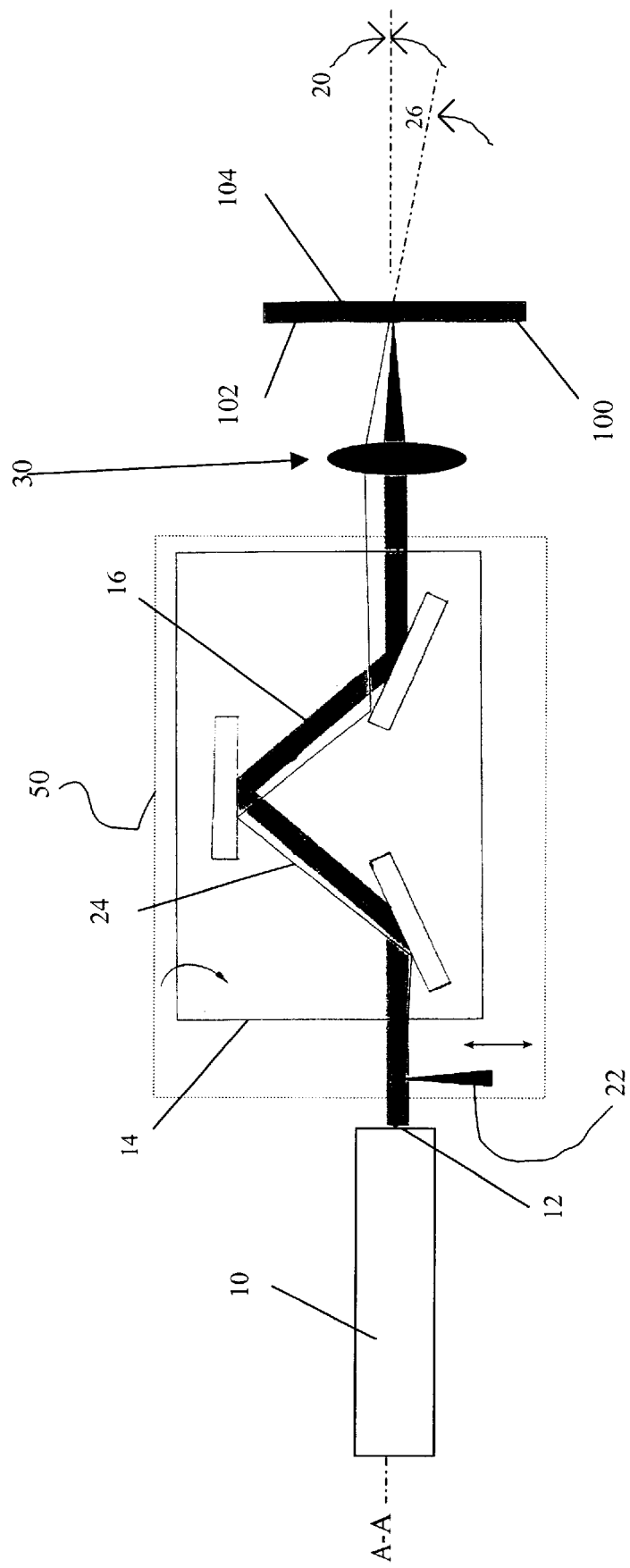
FIG. 1 is an illustration of a preferred embodiment.
Figure 2:
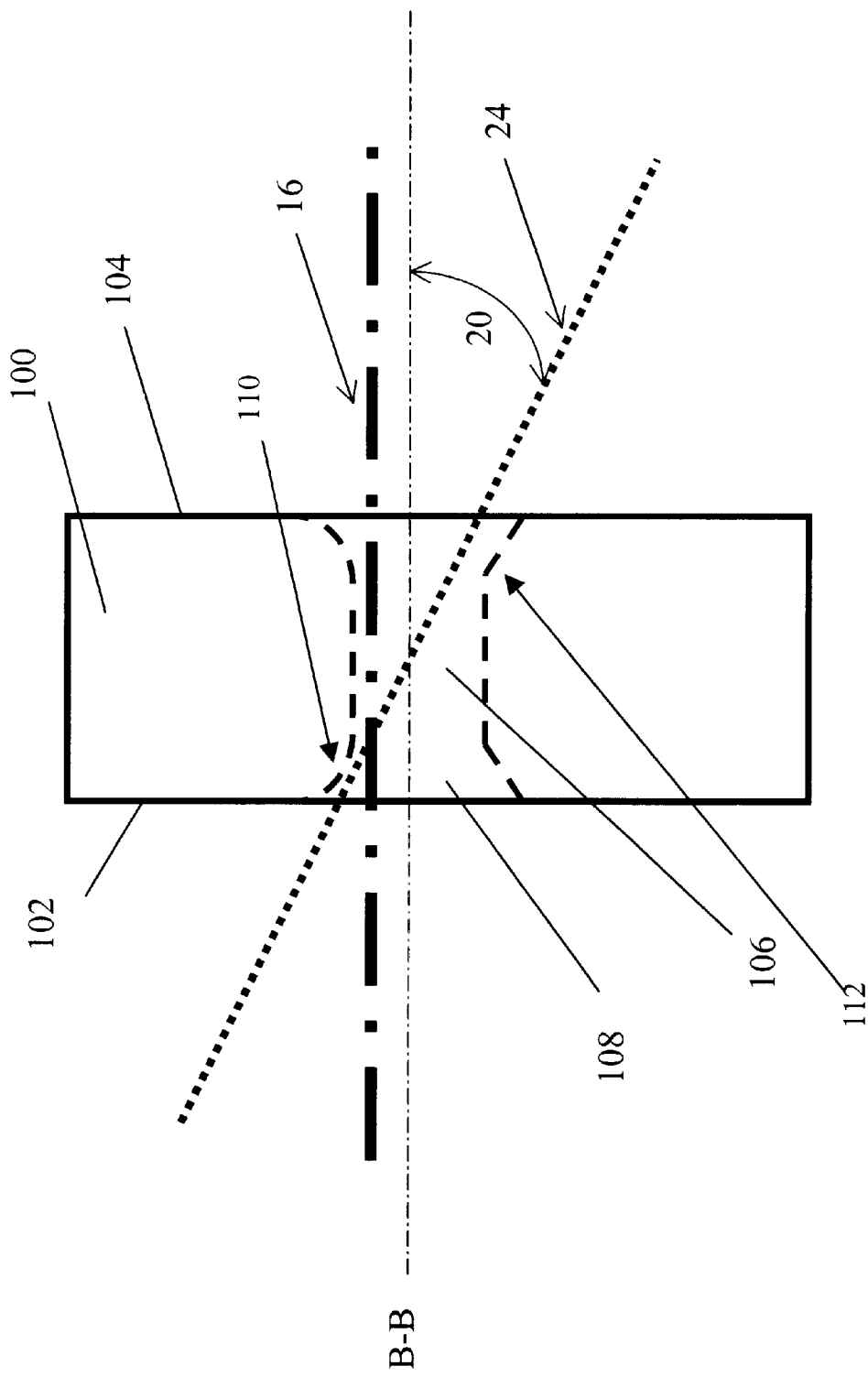
FIG. 2 is an illustration of the orifice and chamfer formed in a workpiece by the preferred embodiment shown in FIG. 1.

Referring to FIGS. 1 and 2, the laser machining apparatus includes a laser light source 10 that provides a generally coherent light beam 12 along the beam's axis A—A. The apparatus also includes a splitter assembly 50 that includes, preferably, a rotatable beam reflector 14, to direct a first portion of light 16 from the light beam 12 to a work piece 100 via a focusing assembly 30 at a first angle of incidence 20 relative to the beam's axis A—A during a first time interval to form at least one of an orifice 106 and a chamfer 108. The assembly 50 further includes an adjustable beam splitter 22, such as, for example, a prism, to direct another portion of the light beam 24 at a second angle of incidence 26, which can be different from the first angle of incidence 20, to form the other of the at least one of an orifice 106 and a chamfer 108 in the work piece 100 during a second time interval that overlaps a portion of the first time interval. The first and second time intervals can differ in duration, such that the first time interval can be greater than the second time interval or, conversely, the second time interval is greater than the first time interval. That is, the light corresponding to one of the first and second time intervals can be initiated first while the light corresponding to the other time interval is not initiated until a time interval has passed such that both time intervals end at the same instant in time. Preferably, the first and second time intervals are initiated substantially simultaneously and can terminate at the same time or at different intervals.

The workpiece 100 preferably can include at least a first surface 102 and a second surface 104, wherein the first surface 102 can be generally parallel to the second surface 104. Alternatively, the first surface 102 can be generally non-parallel to the second surface 104. The at least one orifice 106 is disposed along a longitudinal axis extending between the first surface 102 and the second surface 104 of the workpiece 100. The at least one chamfer 108 is disposed proximate at least one of the first surface 102 and the second surface 104. Preferably, two chamfers, one at each end of the orifice, are formed. The at least one orifice 106 formed in the workpiece 100 can be configured to have a surface roughness $R_a$ of less than two microns.

Using the preferred embodiments, the surface roughness $R_a$ of the orifice 106 is provided between approximately 0.05 and approximately 0.13 microns such that the surface roughness and the cross-sectional shape of the chamfer(s) result in an orifice coefficient between approximately 0.6 and approximately 1.0. As used here, the term "surface roughness $R_a$" is an arithmetic mean value of the absolute values of a surface profile divided by the quantity of the values sensed by a sensing instrument, such as, for example, a surface profilometer or even by optical scanning, including a laser type atomic force microscope.

The chamfers 108 can be, for example, bellmouth shape or conical shape. For example, an orifice may have two substantially bellmouth shaped chamfer 110 for the respective ends of the orifice. Alternatively, the orifice may have two conical shaped chamfer 112 or a combination of conical shaped chamfer 112 at one end and a bell shaped chamfer at the other end. A conical shaped chamfer 112 can be defined by a cone whose walls diverge at a constant angle and whose vertex is disposed along an axis of the orifice. A bellshaped chamfer 110 consists of two sections. At a first end, the walls of the bell diverge at a relatively large angle but the degree of divergence tapers off at the second end. At the second end, the divergence angle of the walls of the chamfer is very small. Although two examples are given, it should be noted, however, that the chamfer could be configured into any cross-sectional shape that, under actual flow conditions, will produce an orifice coefficient of at least 0.6. As used here, the term "orifice coefficient," or "coefficient of discharge", is a function of, among other variables, the ratio of the cross sectional area of the inlet with respect to the cross sectional area of the orifice itself as well as the Reynolds Number of the fluid flow through the orifice. The orifice coefficient is believed to be an indicator of frictional loss incurred by flow within an orifice.

In operation, at least a first beam 16 and a second beam 24 are emitted from the laser light source 10 towards the workpiece 100. The laser light source 10 can be either a gas or a solid-state laser. The at least a first beam 16 and a second beam 24 are rotated an angle 20 with respect to the longitudinal axis A—A. The at least one orifice 106 is formed in the workpiece 100 with at least one of the first and second beams 16, 24 during a first time interval; and at least one chamfer 108 is formed in the workpiece 100 with the other of the first and second beams 16, 24 during a second time interval. Preferably, the second time interval overlaps a portion of the first time interval. The first and second beams 16, 24 can be directed to the workpiece 100 at different power densities. Preferably, the power density or irradiance of the laser light source(s) should be less than approximately $1 \times 10^{12}$ Watts per centimeter-squared (Terawatt/cm$^2$) and at least approximately $1 \times 10^6$ Watts per centimeter-squared (Gigawatt/cm$^2$). Preferably, the laser light source(s) can be a copper vapor laser or a frequency doubled neodymium: yttrium, aluminum, garnet (Nd: YAG) laser having a wavelength between approximately 511 nanometer and approximately 578 nanometer.

At least one of the first and second beams 16, 24 can be aimed toward the workpiece 100 at a first angle of incidence 20 to form at least one orifice 106 on the workpiece 100; and the other of the first and second beams 16, 24 can be aimed towards a perimeter of the at least one orifice 106 at a second angle of incidence 26 to form the at least one chamfer 108 on the at least one orifice 106. The at least one of the first and second beams 16, 24 can be aimed by focusing the at least one of the first and second beams 16, 24 to a target at or below one of the first and second surfaces 102, 104. Aiming the at least one of the first and second beams 16, 24 can be further achieved by focusing at least one of the first and second beams 16, 24 to a desired irradiance and fluence. The at least one of the first and second beams 16, 24 can be rotated about the longitudinal axis A—A so as to generate at least part of a curved surface of a cone that has its vertex between the first and second surfaces 102, 104 of the workpiece 100. Also, at least one of the first and second beams 16, 24 can be pulsewidth modulated to control the intensity of the laser light source. Preferably, a laser light source 10 of about 0.3 milliJoules with a pulsewidth of about 25 nanosecond can be used to supply the light beam 12. In a preferred embodiment, the laser light 12 should have a wavelength of about 1.0 microns or less with a fluence at focus of about $10^4$ Joules per centimeter-squared and an irradiance at focus of about 1 Gigawatt to 1 Terawatt per centimeter-squared.

The preferred embodiments herein described can be used to form orifices for fuel injectors. Other applications of the preferred embodiments may include inkjet or laser printers, microcircuit boards, micro-machined devices, and any other devices, which require a plurality of orifices of consistent dimensionality including surface roughness, entry and exit geometry that allows for an orifice coefficient that is believed to be at least 0.6.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. A laser machining apparatus, the apparatus comprising:
    a laser light source that provides a generally coherent light beam along an axis of the beam;
    a light directing device to direct a first portion of light from the light beam to a work piece at a first angle of incidence relative to the axis of the beam during a first time interval to form at least one of an orifice and a chamfer; and
    an adjustable beam splitter to direct another portion of the light beam to form the other of the at least one of an orifice and a chamfer in the work piece during a second time interval that overlaps a portion of the first time interval.

2. The laser machining apparatus as claimed in claim 1, wherein the another portion is directed to the work piece at a second angle of incidence different from the first angle.

3. The laser machining apparatus as claimed in claim 1, wherein the first time interval is greater than the second time interval.

4. The laser machining apparatus as claimed in claim 1, wherein one of the first and second time intervals is greater than the other of the first and second time intervals.

5. The laser machining apparatus as claimed in claim 1, wherein the workpiece comprises at least a first surface and a second surface.

6. The laser machining apparatus as claimed in claim 5, wherein the first surface is generally parallel to the second surface.

7. The laser machining apparatus as claimed in claim 5, wherein the first surface is generally non-parallel to the second surface.

8. The laser machining apparatus as claimed in claim 1, wherein the at least one orifice includes an orifice coefficient of at least 0.6.

9. The laser machining apparatus as claimed in claim 1, wherein the at least one chamfer includes a cone having a vertex of the cone disposed on a longitudinal axis of the at least one orifice.

10. The laser machining apparatus as claimed in claim 1, wherein the at least one chamfer includes a bellmouth shaped surface disposed along a longitudinal axis of the at least one orifice.

11. The laser machining apparatus as claimed in claim 1, wherein the light directing device comprises a reflective beam rotator.

12. The laser machining apparatus as claimed in claim 1, wherein the adjustable beam splitter comprises a prism.

13. A method of forming at least one orifice and at least one chamfer in a workpiece, the at least one orifice disposed along a longitudinal axis extending between a first surface and a second surface of a workpiece, the at least one chamfer disposed proximate at least one of the first surface and the second surface, the method comprising:

provinding at least a first beam and a second beam that are emitted from a laser light source towards the workpiece;

rotating at least a first beam and a second beam with respect to the longitudinal axis;

forming at least one orifice in the workpiece with at least one of the first and second beams during a first time interval; and forming the at least one chamfer in the workpiece with the other of the first and second beams during a second time interval that overlaps a portion of the first time interval.

14. The method as claimed in claim 13, wherein the providing further comprises emitting at least one of the first beam and second beam towards one of first and second surface that is generally parallel to the other of the first and second surfaces of the workpiece.

15. The method as claimed in claim 13, wherein the providing further comprises emitting at least one of the first beam and second beam towards one of first and second surface that is generally non-parallel to the second surface of the workpiece.

16. The method as claimed in claim 13, wherein the providing further comprises:

directing at least one of the first and second beams to a workpiece at a first power density; and directing the other of the first and second beams to the workpiece at a second power density.

17. The method as claimed in claim 13, wherein the providing further comprises:

aiming at least one of the first and second beams toward a workpiece at a first angle of incidence to form at least one orifice on the workpiece; and aiming the other of the first and second beams towards a perimeter of the at least one orifice at a second angle of incidence to form the at least one chamfer on the at least one orifice.

18. The method as claimed in claim 17, wherein the aiming further comprises focusing at least one of the first and second beams to a target at or below one of the first and second surfaces.

19. The method as claimed in claim 15, wherein the aiming further comprises focusing at least one of the first and second beam to one of a desired irradiance and fluence.

20. The method as claimed in claim 13, wherein the forming of the at least one chamfer comprises forming a chamfer about the longitudinal axis so that the at least one orifice has an orifice coefficient of about 0.6 or greater.

21. The method as claimed in claim 13, wherein the providing further comprises rotating at least one of first and second beams about the longitudinal axis so as to generate at least part of a curved surface of a cone that has its vertex between the first and second surfaces of the workpiece.

22. The method according to claim 13, wherein the providing further comprises rotating at least one of the first and second beams about the axis of the at least one orifice so as to generate at least a portion of a bellmouth shaped surface that defines the at least one chamfer.

23. The method according to claim 13, wherein the providing further comprises pulsewidth modulating at least one of the first beam and second beam.

24. The method according to claim 13, wherein the providing further comprises a laser light source of about 0.3 milliJoules with a pulsewidth of about 25 nanosecond or less.

25. The method according to claim 13, wherein the forming of the at least one orifice and the forming of the at least one chamfer comprise the formation of at least one orifice having a surface roughness of less than two microns.

* * * * *